United States Patent
Wu et al.

(10) Patent No.: US 6,239,948 B1
(45) Date of Patent: May 29, 2001

(54) NON-MAGNETIC NICKEL CONTAINING CONDUCTOR ALLOYS FOR MAGNETIC TRANSDUCER ELEMENT FABRICATION

(75) Inventors: Xuehua Wu, Union City; Kochan Ju, Fremont; Jei-Wei Chang, Cupertino, all of CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 09/360,120

(22) Filed: Jul. 23, 1999

(51) Int. Cl.$^7$ .................................................. G11B 5/235
(52) U.S. Cl. .............................................................. 360/120
(58) Field of Search ............................... 360/313, 327.24, 360/327.33, 324.11, 324.12, 120

(56) References Cited

U.S. PATENT DOCUMENTS

| | | | |
|---|---|---|---|
| 4,695,403 | * 9/1987 | Nishimura et al. | 252/513 |
| 5,282,308 | 2/1994 | Chen et al. | 29/603 |
| 5,285,340 | 2/1994 | Ju et al. | 360/119 |
| 5,381,125 | * 1/1995 | Chen et al. | 338/32 R |
| 5,404,952 | * 4/1995 | Vinegar et al. | 166/303 |
| 5,405,646 | * 4/1995 | Nanis | 427/131 |
| 5,652,687 | 7/1997 | Chen et al. | 360/126 |
| 5,843,521 | 12/1998 | Ju et al. | 427/129 |
| 5,878,481 | 3/1999 | Feng et al. | 29/603.15 |

* cited by examiner

*Primary Examiner*—Craig A. Renner
*Assistant Examiner*—Angel Castro
(74) *Attorney, Agent, or Firm*—George O. Saile; Stephen B. Ackerma

(57) ABSTRACT

A non-magnetic conductor material, a magnetic transducer element having formed therein a non-magnetic conductor layer formed of the non-magnetic conductor material and a method for forming a magnetic transducer element having formed therein the non-magnetic conductor layer formed of the non-magnetic conductor material. The non-magnetic conductor material comprises an alloy comprising nickel and at least one non-magnetic conductor metal selected from the group consisting of copper at a weight percent of from about 45 to about 90, zinc at a weight percent of from about 20 to about 75, cadmium at a weight percent of from about 35 to about 85, platinum at a weight percent of from about 55 to about 90 and palladium at a weight percent of from about 75 to about 95. The non-magnetic conductor material contemplates the magnetic transducer element and the method for forming the magnetic transducer element. The non-magnetic conductor material has physical properties, chemical properties and electrochemical properties, but not magnetic properties, analogous to the physical properties, chemical properties and electrochemical properties exhibited by magnetic layers employed within magnetic transducer elements.

16 Claims, 3 Drawing Sheets

NON-MAGNETIC NICKEL CONTAINING CONDUCTOR ALLOYS FOR MAGNETIC TRANSDUCER ELEMENT FABRICATION

BACKGROUND OF THE INVENTION

1. Field of the Invention

The present invention relates generally to magnetic transducer elements, as employed within magnetic data storage and retrieval. More particularly, the present invention relates to magnetic transducer elements fabricated with enhanced manufacturability and reliability, as employed within magnetic data storage and retrieval.

2. Description of the Related Art

The recent and continuing advances in computer and information technology have been made possible not only by the correlating advances in the functionality, reliability and speed of semiconductor integrated circuits, but also by the correlating advances in the storage density and reliability of direct access storage devices (DASDs) employed in digitally encoded magnetic data storage and retrieval.

Storage density of direct access storage devices (DASDs) is typically determined as areal storage density of a magnetic data storage medium formed upon a rotating magnetic data storage disk within a direct access storage device (DASD) magnetic data storage enclosure. The areal storage density of the magnetic data storage medium is defined largely by the track width, the track spacing and the linear magnetic domain density within the magnetic data storage medium. The track width, the track spacing and the linear magnetic domain density within the magnetic data storage medium are in turn determined by several principal factors, including but not limited to: (1) the magnetic read-write characteristics of a magnetic read-write head employed in reading and writing digitally encoded magnetic data from and into the magnetic data storage medium; (2) the magnetic domain characteristics of the magnetic data storage medium; and (3) the separation distance of the magnetic read-write head from the magnetic data storage medium.

While magnetic read-write heads are thus integral and essential within the art of magnetic data storage and retrieval, magnetic read-write heads are nonetheless not fabricated entirely without problems within the art of magnetic data storage and retrieval. In that regard, it is known in the art of magnetic data storage and retrieval that magnetic transducer elements within magnetic read-write heads, which magnetic transducer elements are typically required to be formed with uniformly controlled diminishing dimensions as areal recoding densities of magnetic data storage media increase, are often difficult to manufacturably and reliably fabricate with such requisite levels of uniformly controlled dimension.

It is thus towards the goal of providing within magnetic read-write head fabrication methods and materials which may be employed for forming with enhanced manufacturability and reliability magnetic transducer elements within magnetic read-write heads that the present invention is directed.

Various magnetic transducer elements having desirable properties, and/or methods for fabrication thereof, have been disclosed within the art of magnetic read-write head fabrication.

For example, Chen et al., in U.S. Pat. No. 5,282,308, disclose a method for forming within a magnetic transducer element, with reduced process complexity and relaxed registration alignment tolerance requirements, a stitched upper magnetic pole layer comprising: (1) an upper magnetic pole tip layer having formed partially contacting and overlapping thereupon, and aligned thereto; (2) an upper magnetic pole yoke layer. The method realizes the foregoing objects by employing when forming the stitched upper magnetic pole layer a radiation hardened portion of a photoresist masking frame employed for forming the upper magnetic pole tip layer, where the radiation hardened portion of the photoresist masking frame provides a stitching pedestal at a location adjoining an overlap of the upper magnetic pole tip layer and the upper magnetic pole yoke layer.

In addition, Ju et al., in U.S. Pat. No. 5,285,340, discloses a magnetic transducer element wherein a lower magnetic pole tip layer and an upper magnetic pole tip layer which are sandwiched between and contacting, respectively, a corresponding lower magnetic pole yoke layer and a corresponding upper magnetic pole yoke layer within the magnetic transducer element are precisely aligned with an equivalent pole tip width, and where each of the lower magnetic pole tip layer and the upper magnetic pole tip layer has a thickness closely controlled. The magnetic transducer element employs when forming the upper pole tip layer separated from the lower pole tip layer by a gap filling layer within the magnetic transducer element a single photoresist masking frame in conjunction with a sequential photoresist masking frame plating method to provide a photoresist masking frame plated composite lower magnetic pole tip layer/gap filling layer/upper magnetic pole tip layer fully areally aligned.

Further, Cole et al., in U.S. Pat. No. 5,452,164, discloses a magnetic transducer element having a narrow magnetic pole tip structure at an air bearing surface of the magnetic transducer element, as well as a well defined zero throat level at a back surface of the magnetic pole tip structure. The foregoing objects are realized, when fabricating the magnetic transducer element, by defining a pole tip structure within the magnetic transducer element prior to forming an upper pole yoke layer within the magnetic transducer element.

Finally, Cohen et al., in U.S. Pat. No. 5,673,163, discloses a magnetic transducer element having virtually eliminated therein track edge noise. The magnetic transducer element realizes the foregoing object by employing a pair of magnetic pole layers which encircle a gap filling layer within the magnetic transducer element such that no magnetic flux emanates from the corners and side edges of the magnetic pole layers within the magnetic transducer element.

Desirable within the art of magnetic head fabrication and magnetic transducer element fabrication are additional methods and materials through which there may be fabricated with enhanced manufacturability and reliability magnetic transducer elements for use within magnetic heads.

It is towards the foregoing object that the present invention is directed.

SUMMARY OF THE INVENTION

A first object of the present invention is to provide methods and materials for forming a magnetic transducer element.

A second object of the present invention is to provide methods and materials in accord with the first object of the present invention, such that the magnetic transducer element is fabricated with enhanced manufacturability and reliability.

A third object of the present invention is to provide methods and materials in accord with the first object of the present invention and the second object of the present invention, which methods are readily commercially implemented.

In accord with the objects of the present invention, there is provided by the present invention a non-magnetic conductor material, a magnetic transducer element having formed therein a non-magnetic conductor layer formed of the non-magnetic conductor material and a method for forming the magnetic transducer element having formed therein the non-magnetic conductor layer formed of the non-magnetic conductor material. The non-magnetic conductor material comprises an alloy comprising nickel and at least one non-magnetic conductor metal selected from the group consisting of copper at a weight percent of from about 45 to about 90, zinc at a weight percent of from about 20 to about 75, cadmium at a weight percent of from about 35 to about 85, platinum at a weight percent of from about 55 to about 90 and palladium at a weight percent of from about 75 to about 95.

The non-magnetic conductor material contemplates: (1) the magnetic transducer element having formed therein the non-magnetic conductor layer formed of the non-magnetic conductor material, as well as; (2) the method for forming the magnetic transducer element having formed therein the non-magnetic conductor layer formed of the non-magnetic conductor material.

The present invention provides methods and materials for forming a magnetic transducer element, such that the magnetic transducer element is fabricated with enhanced manufacturability and reliability. The present invention realizes the foregoing objects by employing when forming the magnetic transducer element a non-magnetic conductor layer formed of a non-magnetic conductor material comprising an alloy comprising nickel and a non-magnetic conductor metal selected from the group consisting of copper at a weight percent of from about 45 to about 90, zinc at a weight percent of from about 20 to about 75, cadmium at a weight percent of from about 35 to about 85, platinum at a weight percent of from about 55 to about 90 and palladium at a weight percent of from about 75 to about 95. It has been determined experimentally, particularly with respect to nickel-copper alloy non-magnetic conductor materials in accord with the present invention that non-magnetic conductor materials in accord with the present invention possess physical properties, chemical properties and electrochemical properties, but not magnetic properties, comparable to the physical properties, chemical properties and electrochemical properties possessed by magnetic materials which may be employed when fabricating magnetic transducer elements.

The present invention is readily commercially implemented. The present invention employs methods and materials which, although not necessarily previously implemented within the art of magnetic transducer element fabrication are, as illustrated within the Description of the Preferred Embodiment which follows, nonetheless readily adapted to the art of magnetic transducer element fabrication. Since the present invention may be implemented absent significant investment for hardware or materials development to implement the present invention, the method of the present invention is readily commercially implemented.

BRIEF DESCRIPTION OF THE DRAWINGS

The objects, features and advantages of the present invention are understood within the context of the Description of the Preferred Embodiment, as set forth below. The Description of the Preferred Embodiment is understood within the context of the accompanying drawings, which forms a material part of this disclosure, wherein.

DESCRIPTION OF THE PREFERRED EMBODIMENT

Figure 1:
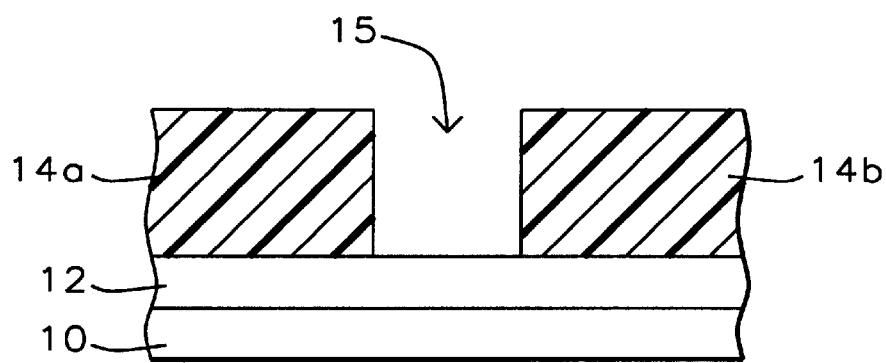
FIG. 1, FIG. 2 and FIG. 3 show a series of schematic air bearing surface (ABS) view diagrams illustrating the results of progressive stages in fabricating a magnetic transducer element in accord with the present invention.

The present invention provides methods and materials for forming a magnetic transducer element, such that the magnetic transducer element is fabricated with enhanced manufacturability and reliability. The present invention realizes the foregoing objects by employing when forming the magnetic transducer element a non-magnetic conductor layer comprising of a non-magnetic conductor material comprising an alloy comprising nickel and a non-magnetic conductor metal selected from the group consisting of copper at a weight percent of from about 45 to about 90, zinc at a weight percent of from about 20 to about 75, cadmium at a weight percent of from about 35 to about 85, platinum at a weight percent of from about 55 to about 90 and palladium at a weight percent of from about 75 to about 95. It has been determined experimentally, particularly with respect to nickel-copper alloy non-magnetic conductor materials in accord with the present invention, that non-magnetic conductor materials in accord with the present invention possess physical properties, chemical properties and electrochemical properties, but not magnetic properties, comparable to the physical properties, chemical properties and electrochemical properties possessed by magnetic materials which may be employed when fabricating magnetic transducer elements. Thus, the present invention provides methods and materials for forming a magnetic transducer element, such that the magnetic transducer element is fabricated with enhanced manufacturability and reliability.

Although the preferred embodiment of the present invention illustrates the present invention within the context of forming a masking frame plated magnetic pole tip stack layer comprising a masking frame plated lower magnetic pole tip layer having plated thereupon a masking frame plated gap filling layer in turn having plated thereupon a masking frame plated upper magnetic pole tip layer, where the masking frame plated gap filling layer is formed of a non-magnetic conductor material in accord with the present invention, the method of the present invention is not limited to forming a non-magnetic conductor material while employing only a plating method or a masking frame plating method. Rather a non-magnetic conductor material in accord with the present invention may be formed employing methods including but not limited to masking frame plating methods, plating methods other than masking frame plating methods, thermally assisted evaporation methods, electron beam assisted evaporation methods and physical vapor deposition (PVD) methods such as but not limited to physical vapor deposition (PVD) sputtering methods.

Similarly, although the preferred embodiment of the present invention illustrates the present invention within the context of forming a gap filling layer while employing a non-magnetic conductor material in accord with the present invention, the non-magnetic conductor material of the present invention may be employed in forming non-magnetic layers within magnetic transducer elements including but not limited to non-magnetic conductor gap filling layers within magnetic transducer elements and non-magnetic conductor spacer layers of various varieties within magnetic transducer elements of correspondingly various varieties.

Finally, although the preferred embodiment of the present invention illustrates the present invention within the context of forming a gap filling layer within an inductive magnetic transducer element while employing a non-magnetic conductor material in accord with the present invention, the present invention may be employed for forming non-magnetic conductor layers within magnetic transducer elements including but not limited to inductive magnetic read transducer elements, inductive magnetic write transducer elements, inductive magnetic read-write transducer elements, merged inductive magnetic write magnetoresistive (MR) read transducer elements and non-merged inductive magnetic write magnetoresistive (MR) read transducer elements, which may be employed within corresponding magnetic heads within magnetic data storage and transduction applications including but not limited to digital magnetic data storage and transduction applications and analog magnetic data storage and transduction applications while employing magnetic data storage enclosures including but not limited to direct access storage device (DASD) magnetic data storage enclosures and linear access storage device (LASD) magnetic data storage enclosures.

Figure 2:
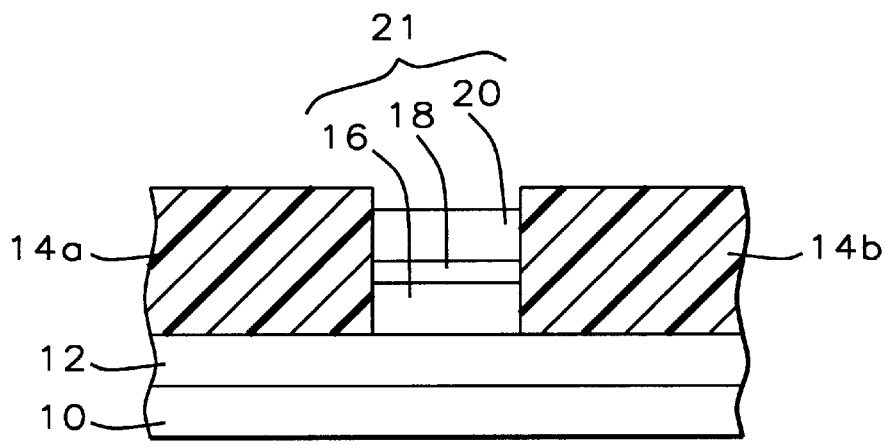
Figure 3:
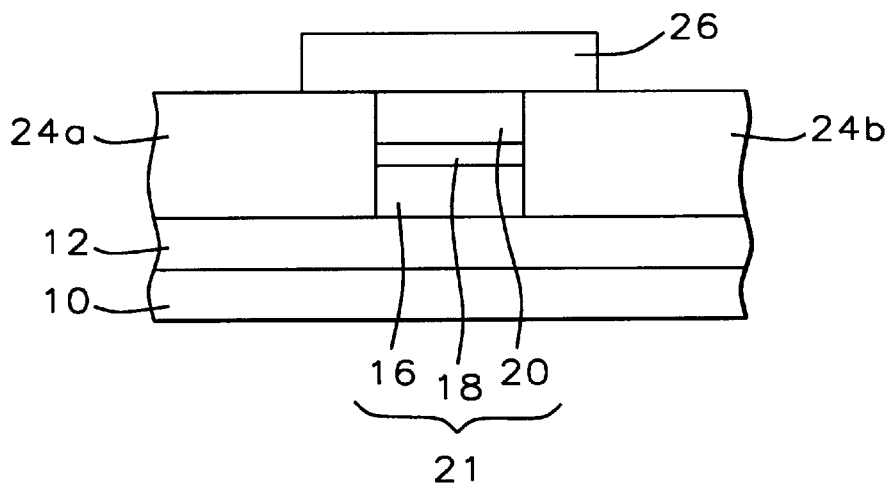

Referring now to FIG. 1 to FIG. 3, there is shown a series of schematic air bearing surface (ABS) view diagrams illustrating the results of progressive stages in forming in accord with a preferred embodiment of the present invention a magnetic transducer element.

Shown in FIG. 1 is a schematic air bearing surface (ABS) view diagram of the magnetic transducer element at an early stage in its fabrication in accord with the preferred embodiment of the present invention.

Shown in FIG. 1, in a first instance, is a substrate 10 upon which is formed a lower magnetic pole yoke layer 12, upon which in turn is formed a pair of patterned masking frame layers 14a and 14b, which in turn define an aperture 15.

Within the preferred embodiment of the present invention with respect to the substrate 10, although it is known in the art of magnetic transducer element fabrication that substrates may be formed of non-magnetic ceramic materials selected from the group including but not limited to oxides, nitrides, borides, carbides, and homogeneous or heterogeneous aggregates or laminates of oxides, nitrides, borides and carbides, for the preferred embodiment of the present invention the substrate 10 is typically and preferably formed of an alumina-titanium carbide non-magnetic ceramic material. Typically and preferably, the substrate 10 is formed of sufficient dimensions such that the substrate 10 may be fabricated into a slider employed within a magnetic transducer element employed within a magnetic head employed within a direct access storage device (DASD) magnetic data storage enclosure employed within digitally encoded magnetic data storage and transduction applications, although, as suggested above, a magnetic transducer element fabricated in accord with the present invention may be employed within a magnetic head employed within magnetic data storage and transduction applications including but not limited to digital magnetic data storage and transduction applications and analog magnetic data storage and transduction applications while employing magnetic data storage enclosures including but not limited to direct access storage device (DASD) magnetic data storage enclosures and linear access storage device (LASD) magnetic data storage enclosures.

Figure 4:
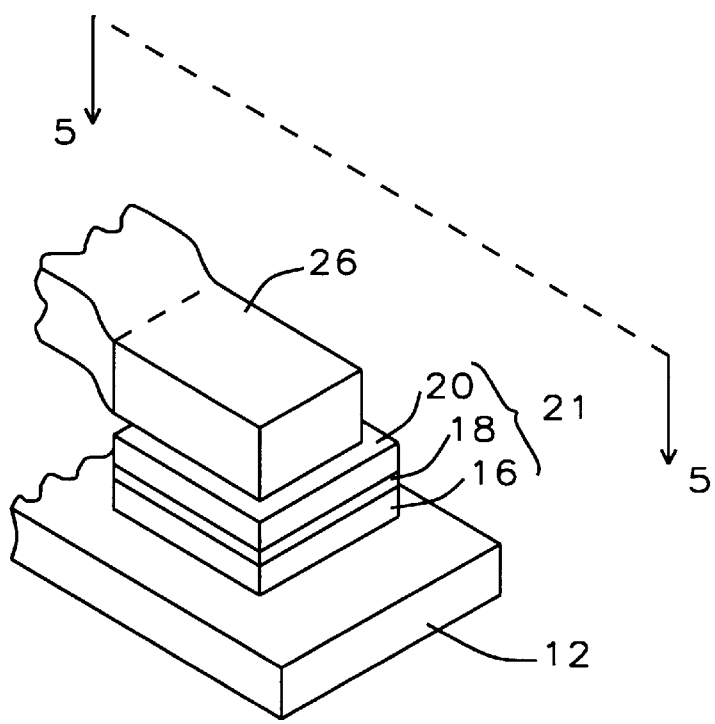
FIG. 4 shows a schematic isometric view diagram illustrating a magnetic transducer element analogous to the magnetic transducer element whose schematic air bearing surface (ABS) view diagram is illustrated in FIG. 3.

Similarly, although also not specifically illustrated within the schematic air bearing surface (ABS) view diagram of FIG. 4, the substrate 10 may be a substrate alone as employed within a magnetic transducer element, or in the alternative, the substrate 10 may comprise the substrate as employed in forming the magnetic transducer element, where the substrate has formed thereupon and/or thereover, and thus incorporated therein, any of several additional layers as are commonly employed in forming a magnetic transducer element or a magnetic head while employing the substrate. Such additional layers may include, but are not limited to undercoating layers, additional magnetic pole layers, shield layers and related layers directed towards incorporation of a magnetoresistive (MR) sensor element into a magnetic head formed employing the magnetic transducer element whose schematic cross-sectional diagram is illustrated in FIG. 1.

Within the preferred embodiment of the present invention with respect to the lower magnetic pole yoke layer 12, the lower magnetic pole yoke layer 12 may be formed employing soft magnetic materials as are conventional in the art of magnetic transducer element fabrication, such soft magnetic materials including but not limited to nickel-iron permalloy alloys, nickel-cobalt alloys, nickel-iron-cobalt alloys and related higher order alloys incorporating the foregoing alloys, formed employing methods including but not limited to plating methods, evaporative deposition methods and physical vapor deposition (PVD) methods. Within the preferred embodiment of the present invention, the lower magnetic pole yoke layer 12 is typically and preferably formed of a nickel-iron permalloy alloy of nickel:iron weight ratio from about 80:20 to about 45:55, and to a thickness of from about 2000 to about 30000 angstroms.

Within the preferred embodiment of the present invention with respect to the pair of patterned masking frame layers 14a and 14b, the pair of patterned masking frame layers 14a and 14b may be formed employing masking materials as are conventional in the art of magnetic transducer element fabrication, such masking materials typically but not exclusively being photoresist masking materials selected from the general groups including but not limited to positive photoresist masking materials and negative photoresist masking materials. The pair of patterned masking frame layers 14a and 14b provides the aperture 15 defined by the pair of patterned masking layers 14a and 14b, the aperture 15 having a bidirectional aperture width of about 0.3 to about 3.0 microns. Typically and preferably each of the patterned masking frame layers 14a and 14b is formed to a thickness of from about 20000 to about 100000 angstroms.

Referring now to FIG. 2, there is shown a schematic air bearing surface (ABS) view diagram illustrating the results of further processing of the magnetic transducer element whose schematic air bearing surface (ABS) view diagram is illustrated in FIG. 1. Shown in FIG. 2 is a schematic air bearing surface (ABS) view diagram of a magnetic transducer element otherwise equivalent to the magnetic transducer element whose schematic air bearing surface (ABS) view diagram is illustrated in FIG. 1, but wherein there is formed into the aperture 15 defined by the pair of patterned masking frame layers 14a and 14b a magnetic pole tip stack layer 21 comprising a lower magnetic pole tip layer 16 having formed thereupon a gap filling layer 18 in turn having formed thereupon an upper magnetic pole tip layer 20.

Within the preferred embodiment of the present invention, the lower magnetic pole tip layer 16 and the upper magnetic pole tip layer 20 may be formed from any of the several materials as are employed for forming the lower magnetic pole yoke layer 12. Typically and preferably, each of the lower magnetic pole tip layer 16 and the upper magnetic pole tip layer 20 is formed of a nickel-iron permalloy alloy soft magnetic material of a nickel:iron weight ratio from about 80:20 to about 45:55, each to a thickness of from about 500 to about 40000 angstroms.

Within the preferred embodiment of the present invention with respect to the gap filling layer 18, the gap filling layer 18 is formed employing a non-magnetic conductor material in accord with the present invention, wherein the non-magnetic conductor material comprises an alloy comprising nickel and at least one non-magnetic conductor metal selected from the group consisting of copper at a weight percent of from about 45 to about 90 (more preferably from about 52 to about 75), zinc at a weight percent from about 20 to about 75 (more preferably from about 30 to about 60), cadmium at a weight percent of from about 35 to about 85 (more preferably from about 45 to about 75), platinum at a weight percent of from about 55 to about 90 (more preferably from about 65 to about 80) and palladium at a weight percent of from about 75 to about 95 (more preferably from about 80 to about 90). Within the context of the present invention, the gap filling layer 18 may also be formed of a nickel-chromium alloy of chromium content from about 40 to about 90 weight percent (more preferably from about 45 to about 80 weight percent). Yet more preferably, within the preferred embodiment of the present invention with respect to the gap filling layer 18, the gap filling layer 18 is more preferably formed employing a non-magnetic conductor material in accord with the present invention, wherein the non-magnetic conductor material consists essentially of an alloy consisting essentially of nickel and at least one non-magnetic conductor metal selected from the group consisting of copper, zinc, cadmium and palladium in accord with the above weight percent limitations, with the remainder nickel. Within the context of the preferred embodiment of the present invention, the gap filling layer 18 may also be formed of a non-magnetic conductor material consisting essentially of a nickel-chromium alloy of chromium content from about 40 to about 90 percent, with the remainder nickel (more preferably from about 45 to about 80 percent, with the remainder nickel). Within the context of the present invention, the use of the terminology "about" is intended to provide for several weight percent variation. Typically and preferably the gap filling layer 18 is formed to a thickness of from about 1000 to about 5000 angstroms.

When formed within the context of the foregoing weight concentrations, the gap filling layer 18 which is formed of the non-magnetic conductor material is formed with physical properties, chemical properties and electrochemical properties, but not magnetic properties, analogous or equivalent to the corresponding physical properties, chemical properties and electrochemical properties possessed by the magnetic material from which is formed the lower magnetic pole tip layer 16 and the upper magnetic pole tip layer 20. Thus, the magnetic transducer element whose schematic air bearing surface (ABS) view diagram is illustrated in FIG. 2 may be formed with enhanced manufacturability and reliability.

As is illustrated within the schematic air bearing surface (ABS) view diagram of FIG. 2, the magnetic pole tip stack layer 21 which comprises the lower magnetic pole tip layer 16, the gap filling layer 18 and the upper magnetic pole tip layer 20 is typically and preferably formed employing a frame plating method. Within the preferred embodiment of the present invention when the gap filling layer 18 is formed of a nickel-copper alloy non-magnetic conductor material of from about 45 to about 90 percent copper, an aqueous plating solution employed within the frame plating method typically and preferably employs: (1) a nickel (II) ion concentration of from about 0.05 to about 0.5 moles per liter; (2) a copper (II) ion concentration of from about 0.001 to about 0.05 moles per liter; (3) a buffer concentration, such as but not limited to a sodium borate buffer concentration, of from about 0.05 to about 0.8 moles per liter; (4) a surfactant concentration, such as but not limited to an FC-93 surfactant (3M Co.) concentration, a FC-95 surfactant (3M Co.) concentration or a sodium lauryl sulfate surfactant concentration of from about 0.005 to about 1.0 grams per liter; (5) a film stress reducing agent concentration, such as but not limited to a sodium saccharine film stress reducing agent concentration of from about 0.1 to about 5 grams per liter; (6) various additional complexing agent concentrations, such as but not limited to acetate, chloride, sulfate, sulfamate and o-phenanthroline complexing agent concentrations of up to about 0.5 moles per liter; (7) a pH of from about 3.0 to about 11; (8) a plating current density of from about 1 to about 20 milliamperes per square centimeter; (9) a plating bath temperature of from about 10 to about 50 degrees centigrade; and (10) an anode formed of nickel, copper or an alloy thereof To plate while employing analogous sequential electroplating methods the lower magnetic pole tip layer 16 and the upper magnetic pole tip layer 20 to form the lower magnetic pole tip layer 16 and the upper magnetic pole tip layer 20 formed of a soft magnetic materials selected from one of the foregoing nickel-iron alloy, nickel-cobalt alloy or nickel-iron-cobalt alloy soft magnetic materials, additional analogous plating baths are employed absent a copper (II) ion concentration which is instead replaced with an appropriate iron (II) ion concentration, cobalt (II) ion concentration, or aggregate concentration thereof Similarly, there may also be employed as an anode, as appropriate, a nickel anode, an iron anode, a cobalt anode or an appropriate alloy anode thereof when electroplating the lower magnetic pole tip layer 16 and the upper magnetic pole tip layer.

Finally, in concert with that which is stated above, and as is understood by a person skilled in the art, while the magnetic pole tip stack layer 21 as illustrated within the magnetic transducer element whose schematic air bearing surface (ABS) view diagram of FIG. 2 is formed sequentially while employing a frame plating method, a nominally equivalent magnetic pole tip stack layer may be formed in accord with the present invention by forming: (1) a blanket lower magnetic pole tip layer having formed thereupon; (2) a blanket gap filling layer in turn having formed thereupon; (3) a blanket upper pole tip layer in turn having formed thereupon; (4) a patterned photoresist layer which serves as an etch mask layer for forming a magnetic pole tip stack layer equivalent to the magnetic pole tip stack layer 21 from corresponding sequential etching of the blanket upper magnetic pole tip layer, the blanket gap filling layer and the blanket lower magnetic pole tip layer. Under such circumstances there may be employed an etchant such as but not limited to a wet chemical etchant or an ion sputtering etchant which within the context of the present invention will typically etch the blanket upper magnetic pole tip layer, the blanket gap filling layer and the blanket lower magnetic pole tip layer at approximately equivalent rates.

Referring now to FIG. 3, there is shown a schematic air bearing surface view diagram illustrating the results of further processing of the magnetic transducer element whose schematic air bearing surface (ABS) view diagram is illustrated in FIG. 2.

Shown in FIG. 3, in a first instance, is a schematic air bearing surface (ABS) view diagram of a magnetic transducer element otherwise equivalent to the magnetic transducer element whose schematic air bearing surface view diagram is illustrated in FIG. 2, but wherein there has been stripped from the magnetic transducer element the pair of patterned masking frame layers 14a and 14b. The pair of patterned masking frame layers 14a and 14b may be stripped from the magnetic transducer element whose schematic air bearing surface (ABS) view diagram is illustrated in FIG. 2 to provide the magnetic transducer element whose schematic air bearing surface (ABS) view diagram is illustrated in FIG. 3 while employing methods as are conventional in the art of magnetic transducer element fabrication, such methods including but not limited to wet chemical stripping methods and dry plasma stripping methods.

Shown also within FIG. 3, in a second instance, is the presence of a pair of patterned non-magnetic layers 24a and 24b formed adjoining a pair of opposite edges of the magnetic pole tip stack layer 21. The pair of patterned non-magnetic layers 24a and 24b will typically and preferably, although not exclusively, be formed of a non-magnetic dielectric material, such as but not limited to a silicon oxide dielectric material, a silicon nitride dielectric material, a silicon oxynitride dielectric material, or an aluminum oxide dielectric material, deposited employing methods as are conventional in the art of magnetic transducer element fabrication, and preferably either intrinsically or extrinsically planarized to leave exposed an upper surface of the upper magnetic pole tip layer 20.

Finally, there is also shown within the schematic cross-sectional diagram of FIG. 3 an upper magnetic pole yoke layer 26 which is formed contacting the upper magnetic pole tip layer 20 and spanning to the pair of patterned non-magnetic layers 24a and 24b. The upper magnetic pole yoke layer 26 is typically and preferably formed employing methods, materials and dimensions analogous or equivalent to the methods, materials and dimensions employed for forming the lower magnetic pole yoke layer 12.

Referring now to FIG. 4, there is shown a schematic isometric view diagram of a magnetic transducer element generally corresponding with the magnetic transducer element whose schematic air bearing surface (ABS) view diagram is illustrated within FIG. 3.

Shown in FIG. 4 is a schematic isometric view diagram of a magnetic transducer element illustrating features generally illustrated within the magnetic transducer element whose schematic air bearing surface (ABS) view diagram of FIG. 3, but wherein there has been omitted, for clarity, the substrate 10 and the pair of patterned non-magnetic layers 24a and 24b. Similarly, while the schematic air bearing surface (ABS) view diagram of FIG. 3 illustrates the upper magnetic pole yoke layer 26 as wider than the magnetic pole tip stack layer 21, the schematic isometric view diagram of FIG. 4 illustrates the upper magnetic pole yoke layer 26 as narrower than the magnetic pole tip stack layer 21.

Figure 5:
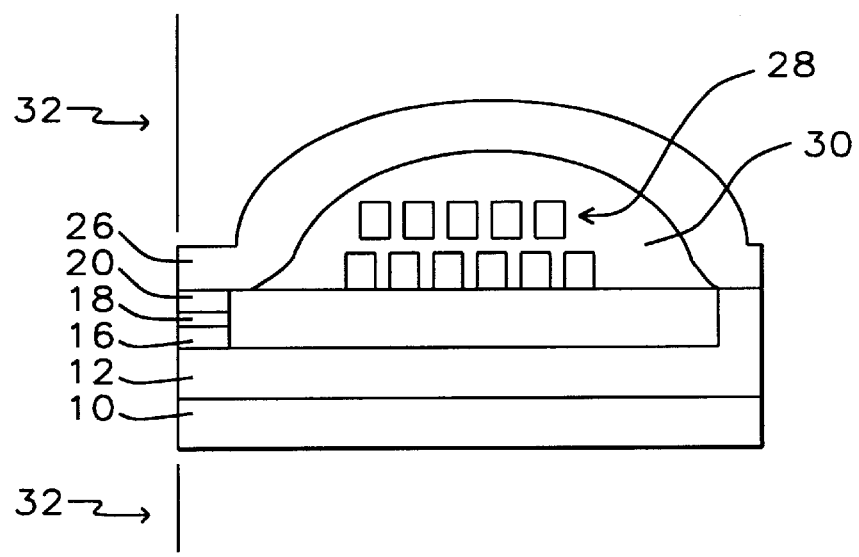
FIG. 5 shown a schematic cross-sectional diagram illustrating a magnetic transducer element equivalent to the magnetic transducer element whose schematic air bearing surface view diagram is illustrated in FIG. 3.

Referring now to FIG. 5, there is shown a schematic cross-sectional diagram of a magnetic transducer element corresponding generally with the magnetic transducer element whose schematic air bearing surface (ABS) view diagram is illustrated in FIG. 3 and whose schematic isometric view diagram is illustrated in FIG. 4. The schematic cross-sectional diagram of FIG. 5 is taken through the sectional line 5—5 of the schematic isometric view diagram of FIG. 4.

As is shown within the schematic cross-sectional diagram of FIG. 5, there is in addition to the structures which are illustrated within the schematic air bearing surface (ABS) view diagram of FIG. 3 and the schematic isometric view diagram of FIG. 4 a series of magnetic coil layers 28 isolated within a magnetic coil isolation layer 30 within a dome formed by the upper magnetic pole yoke layer 26 and enclosed by: (1) the lower magnetic pole yoke layer 12, as well as; (2) the magnetic pole tip stack layer 21 at the location of the air bearing surface (ABS) 32 of the magnetic transducer element.

As is noted above, and as is illustrated below within the context of the examples which follow, a magnetic transducer element fabricated in accord with the present invention is formed with enhanced manufacturability and enhanced reliability, since a non-magnetic conductor layer, such as but not limited to a gap filling layer, is formed within the magnetic transducer element of a non-magnetic material which more closely approximates the physical properties, chemical properties and electrochemical properties, but not the magnetic properties, of a pair of pair of magnetic layers which sandwich the non-magnetic conductor layer.

As is understood by a person skilled in the art, and in concert with that which is noted above, although the preferred embodiment of the present invention illustrates the present invention within the context of forming a gap filling layer interposed between a pair of magnetic pole tip layers within a magnetic transducer element, the present invention may also be employed for forming non-magnetic conductor layers other than gap filling layers adjoining magnetic layers other than magnetic pole tip layers within various types of magnetic transducer elements employed within various types of magnetic heads. In that regard, the present invention may be employed for forming non-magnetic conductor layers including but not limited to non-magnetic conductor gap filling layers and non-magnetic conductor spacer layers adjoining magnetic layers within magnetic transducer elements including but not limited to inductive magnetic write transducer elements, inductive magnetic read transducer elements, inductive magnetic read-write transducer elements, merged inductive magnetic write magnetoresistive (MR) read transducer elements and non-merged inductive magnetic write magnetoresistive (MR) read transducer elements.

EXAMPLES

A pair of alumina-titanium carbide non-magnetic ceramic substrates was obtained and there was formed over each of the alumina-titanium carbide non-magnetic ceramic substrates a seed layer of a nickel-iron (45:55, w:w) alloy material formed to a thickness of about 1000 angstroms.

Upon one of the two seed layers formed upon one of the two alumina-titanium carbide non-magnetic ceramic substrates was then electroplated a layer of a nickel-copper non-magnetic conductor material of nickel:copper weight ratio about 48:52 while employing an electroplating method which employed the following materials, materials concentrations, process parameters and process parameter limitations: (1) a sodium acetate concentration of about 0.1 moles per liter; (2) a boric acid concentration of about 20 grams per liter; (3) a nickel (II) sulfate concentration of about 0.12 moles per liter; (4) a copper (II) sulfate concentration of about 0.0036 moles per liter; (5) a sodium saccharine concentration of about 2 grams per liter; (6) an FC-95 (3M Co.) surfactant concentration of about 10 milligrams per liter; (7) a sufficient sulfuric acid concentration to maintain a pH of about 4.5; (8) a paddle speed of about 1.2 cycles per second; (9) a temperature of about 25 degrees centigrade; (10) a plating current density of about 5 milliamperes per square centimeter; and (11) a nickel anode. The layer of nickel-copper alloy non-magnetic conductor material was plated to a thickness of about 20000 angstroms.

Upon a second of the two seed layers formed upon a second of the two alumina-titanium carbide non-magnetic substrates was electroplated a nickel-iron magnetic conductor material layer having an nickel:iron weight ratio of about 45:55 while employing methods and materials analogous to the methods and materials employed for forming the nickel-copper alloy non-magnetic conductor material layer upon the first seed layer formed upon the first of the two alumina-titanium carbide non-magnetic ceramic substrates, but where in general there was substituted for copper (II) sulfate an appropriate iron (II) sulfate concentration. Similarly, the nickel-iron alloy magnetic conductor material layer was also formed to a thickness of about 20000 angstroms.

There was then measured several physical properties, chemical properties and electrochemical properties of the nickel-copper alloy non-magnetic conductor material layer and the nickel-iron alloy magnetic conductor material layer. The properties included: (1) hardness (as measured employing a nano- and micro-indentation method, which provides a measure of smear resistance when lapping a layer within a magnetic transducer element; (2) corrosion resistance (as measured by determining an electrochemical corrosion potential while employing an electrochemical cell); and (3) etch rate within an aqueous etchant comprising 12.5% sulfuric acid, 10.0% hydrochloric acid, 5.0% hydrogen peroxide and 0.2 ml per liter FC-93 surfactant, which is conventionally employed within magnetic transducer element fabrication.

The results for measurements of the above properties for the nickel-copper alloy non-magnetic conductor material layer and the nickel-iron alloy magnetic conductor material layer are summarized in Table I, as follows. For comparison purposes, corresponding properties for a nickel-iron alloy magnetic conductor material layer of nickel:iron weight ratio about 80:20 are also included.

TABLE I

|  | NiFe 80:20 | NiFe 45:55 | NiCu 48:52 |
| --- | --- | --- | --- |
| Hardness (GPa) | 4.20 | 4.31 | 4.35 |
| Corrosion Potential (mvolts) | +40 | −30 | +20 |
| Etch Rate (u/min) | 1.0 | 1.0 | 1.0 |

As is seen from review of the data within Table I, the various physical properties, chemical properties and electrochemical properties are equivalent or nearly equivalent for each of the nickel-copper alloy non-magnetic conductor material layer and the nickel-iron alloy magnetic conductor material layers. Thus, physical properties, chemical properties and electrochemical properties of magnetic transducer elements fabricated while employing a laminate incorporating the above layers are likely to be equivalent.

As an additional experiment, there was fabricated over a third alumina-titanium carbide substrate a magnetic pole tip stack layer analogous to the magnetic pole tip stack layer 21 as illustrated within the schematic isometric view diagram of FIG. 4, wherein the magnetic pole tip stack layer employed a lower magnetic pole tip layer and an upper magnetic pole tip layer formed of the nickel-iron alloy magnetic conductor material as formed over the second alumina-titanium carbide substrate and the magnetic pole tip layer employed a gap filling layer formed of the same nickel-copper alloy non-magnetic conductor material as formed over the first alumina-titanium carbide substrate. The third alumina-titanium carbide substrate was then thermally annealed for a series of cycles which included: (1) a temperature of about 250 degrees centigrade for a time period of about 5 hours, followed by; (2) a temperature of about 250 degrees centigrade for an additional time period of about 5 hours. The magnetic pole tip stack layer was then analyzed for interdiffusion while employing hysteresis curve measurements obtained before and after the thermal annealing cycles (i.e. if there is a saturation magnetization change in a pole tip stack layer incident to thermal annealing the pole tip stack layer, there is interdiffusion of layers within the magnetic pole tip stack layer). No interdiffusion was observed, thus indicating that a gap thickness of a magnetic pole tip stack layer formed employing a gap filling layer in accord with the present invention will remain stable incident to thermal processing as is conventional within magnetic transducer element fabrication.

As another additional experiment, there were obtained an additional nine alumina-titanium carbide substrates having seed layers formed thereover in accord with the first two alumina titanium-carbide substrates, and there was then plated thereupon a series of nickel-copper alloy conductor material layers analogous to the nickel-copper alloy non-magnetic conductor material layer formed upon the first alumina-titanium carbide substrate, but wherein the concentration of copper (II) sulfate within the plating solution was varied to thus provide a varied concentration of copper within the series of nine nickel-copper alloy conductor material layers so electrodeposited. The concentrations of copper (II) sulfate ranged from zero (providing a pure nickel deposit) to about 6.0 millimoles per liter (which provided a nickel-copper alloy non-magnetic conductor material layer of nickel-copper weight ratio about 25:75). A nickel-copper alloy conductor material layer of nickel:copper weight ratio 50:50 was obtained at about 3.0 millimoles per liter concentration of copper (II) sulfate within the plating bath.

There was then measured for each of the nine nickel-copper alloy conductor material layers a saturation magnetization while employing a hysteresis curve measurement technique as is conventional in the art of magnetic transducer element fabrication. The measurements of saturation magnetizations were then normalized to the saturation magnetization of a nickel-iron (80:20, w:w) permalloy alloy magnetic conductor material and plotted versus copper (II) sulfate concentration within the plating bath to yield the graph of FIG. 6.

Figure 6:
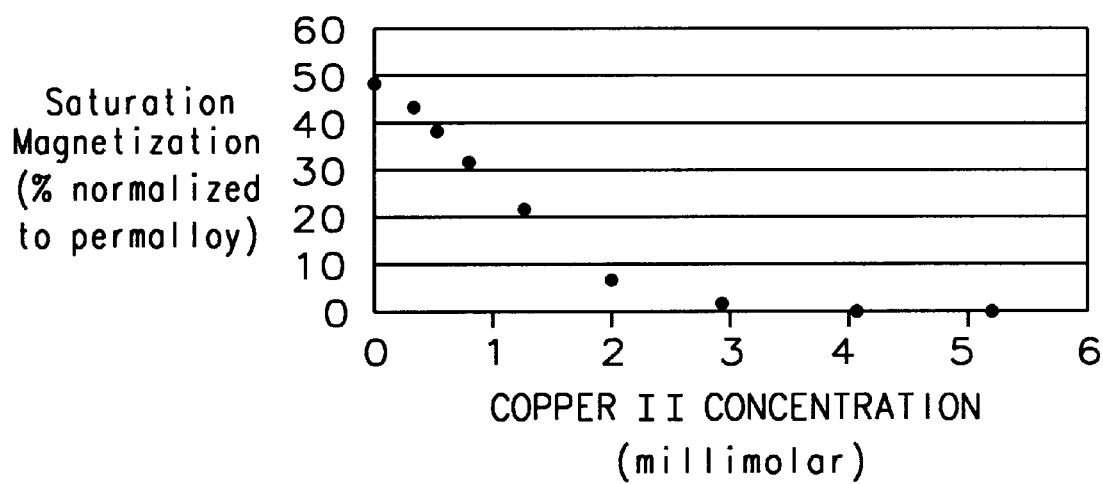
FIG. 6 shown a graph of Saturation Magnetization versus Copper (II) Concentration for a series of nickel-copper alloy layers formed employing an electrochemical plating method in accord with the examples of the present invention.

As is illustrated within the graph of FIG. 6, there is observed limited, if any, magnetic characteristics of a nickel-copper alloy conductor material layer formed at a copper (II) sulfate plating bath concentration of greater than about 3 millimoles per liter, which yields the nickel-copper alloy non-magnetic conductor material layer of copper concentration greater than about 50 weight percent. Thus, it is also clear that the magnetic properties of a nickel-copper alloy non-magnetic conductor material layer in accord with the present invention provide that such a nickel-copper alloy non-magnetic conductor material layer may be employed as a gap filling layer or another non-magnetic conductor spacer layer formed within a magnetic transducer element in accord with the present invention.

As is understood by a person skilled in the art, the preferred embodiment and examples of the present invention are illustrative of the present invention rather than limiting of the present invention. Revisions and modifications may be made to structures and dimensions through which is provided a magnetic transducer element in accord with the preferred embodiment and examples of the present invention while still providing a magnetic transducer element in accord with the present invention, in accord with the appended claims.

What is claimed is:

1. A magnetic transducer element comprising:
    a non-magnetic conductor layer formed of a non-magnetic conductor material comprising an alloy comprising nickel and at least one non-magnetic conductor metal selected from the group consisting of:
        copper at a weight percent from about 45 to about 90;
        zinc at a weight percent from about 20 to about 75;
        cadmium at a weight percent from about 35 to about 85;
        platinum at a weight percent from about 55 to about 90; and
        palladium at a weight percent from about 75 to about 95.

2. The magnetic transducer element of claim 1 wherein the non-magnetic conductor layer is employed as a layer selected from the group consisting of gap filling layers and non-magnetic conductor spacer layers.

3. The magnetic transducer element of claim 1 further comprising a magnetic layer contacting the non-magnetic conductor layer.

4. The magnetic transducer element of claim 3 wherein the magnetic layer is formed from a magnetic material selected from the group consisting of nickel-iron alloys, nickel-cobalt alloys, nickel-iron-cobalt alloys and higher order alloys thereof.

5. A magnetic head having fabricated therein a magnetic transducer element in accord with claim 1.

6. The magnetic head of claim 5 wherein the magnetic head is selected from the group consisting of inductive magnetic read heads, inductive magnetic write heads, inductive magnetic read-write heads, merged inductive magnetic write magnetoresistive (MR) read heads and non-merged inductive magnetic write magnetoresistive (MR) read heads.

7. A magnetic data storage enclosure having formed therein a magnetic head in accord with claim 5.

8. A magnetic transducer element comprising a non-magnetic conductor layer formed of a non-magnetic conductor material comprising an alloy comprising nickel and chromium wherein:
    the alloy comprises a chromium content of from about 40 to about 90 percent; and
    the non-magnetic conductor layer is employed as a gap filling layer.

9. The magnetic transducer element of claim 8 further comprising:
    a pair of magnetic pole layers sandwiching the gap filling layer, wherein:
        the pair of magnetic pole layers is formed of a magnetic material selected from the group consisting of nickel-iron alloys, nickel-cobalt alloys, nickel-iron-cobalt alloys and higher order alloys thereof.

10. A method for forming a magnetic transducer element comprising:
    providing a substrate;
    forming over the substrate a non-magnetic conductor layer formed of a non-magnetic conductor material comprising an alloy comprising nickel and a non-magnetic conductor metal selected from the group consisting of:
        copper at a weight percent from about 45 to about 90;
        zinc at a weight percent from about 20 to about 75;
        cadmium at a weight percent from about 35 to about 85;
        platinum at a weight percent from about 55 to about 90; and
        palladium at a weight percent from about 75 to about 95.

11. The method of claim 10 wherein the non-magnetic conductor layer is selected from the group consisting of gap filling layers and non-magnetic conductor spacer layers.

12. The method of claim 10 further comprising forming in contact with the non-magnetic conductor layer a magnetic layer.

13. The method of claim 12 wherein the magnetic layer is formed from a magnetic material selected from the group consisting of nickel-iron alloys, nickel-cobalt alloys, nickel-iron-cobalt alloys and higher order alloys thereof.

14. The method of claim 13 wherein by employing the non-magnetic conductor material comprising nickel and the non-magnetic conductor metal the non-magnetic conductor material is formed with physical properties, chemical properties and electrochemical properties, but not magnetic properties, which approximate the physical properties, chemical properties and electrochemical properties of the magnetic layer.

15. The method of claim 10 wherein the non-magnetic conductor layer is formed employing a method selected from the group consisting of plating deposition methods, evaporative deposition methods and physical vapor deposition (PVD) methods.

16. A method for forming a magnetic transducer element comprising:
    providing a substrate;
    forming over the substrate a non-magnetic conductor layer formed of a non-magnetic conductor material comprising an alloy comprising nickel and chromium wherein:
        the alloy comprises a chromium content of from about 40 to about 90 percent; and
        the non-magnetic conductor layer is a gap filling layer.

* * * * *